US012598240B2

(12) United States Patent (10) Patent No.: US 12,598,240 B2
Sim et al. (45) Date of Patent: *Apr. 7, 2026

(54) USER INTERACTION AND TASK MANAGEMENT USING MULTIPLE DEVICES

(71) Applicant: Microsoft Technology Licensing, LLC, Redmond, WA (US)

(72) Inventors: Robert A. Sim, Bellevue, WA (US); Adam Fourney, Bothell, WA (US); Russell Allen Herring, Jr., Sammamish, WA (US); Ryen William White, Woodinville, WA (US); Elnaz Nouri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,741

(22) Filed: Dec. 21, 2023

(65) Prior Publication Data

US 2024/0171656 A1 May 23, 2024

Related U.S. Application Data

(63) Continuation of application No. 17/880,290, filed on Aug. 3, 2022, now Pat. No. 11,895,214, which is a (Continued)

(51) Int. Cl.
*H04L 67/60* (2022.01)
*H04L 67/10* (2022.01)

(52) U.S. Cl.
CPC .............. *H04L 67/60* (2022.05); *H04L 67/10* (2013.01)

(58) Field of Classification Search
None
See application file for complete search history.

(56) References Cited

U.S. PATENT DOCUMENTS 8,924,547 B1 * 12/2014 Belk ................... H04L 41/0816
709/224
10,055,681 B2 * 8/2018 Brown ................... G06N 3/008
(Continued)

FOREIGN PATENT DOCUMENTS

CN 104823189 A 8/2015
CN 105324754 A 2/2016

OTHER PUBLICATIONS

First Office Action Received for Chinese Application No. 202080017369.7, mailed on Jan. 18, 2024, 24 pages.
(Continued)

*Primary Examiner* — Quang N Nguyen
(74) *Attorney, Agent, or Firm* — Alleman Hall LLP

(57) ABSTRACT

The present disclosure provides systems and methods for user interaction and task completion using multiple devices. A set of devices may be used to perform a task, such that different devices may perform different steps of the task. A device management service may update state information at each device of the set, thereby enabling a user to interact with any of the computing devices to perform the task. A device management service may also automatically determine which device should be used by the user, based on task or step requirements, device characteristics, and device capabilities, among other examples. Thus, rather than being required to continue a task on the same device (even when the device is not well-suited for the current step or task), the user is provided with the option to use and, in some instances, is automatically transitioned to use, different devices within the set.

20 Claims, 12 Drawing Sheets

Related U.S. Application Data continuation of application No. 16/290,445, filed on Mar. 1, 2019, now Pat. No. 11,438,435.

(56) References Cited

U.S. PATENT DOCUMENTS

| | | | | |
|---|---|---|---|---|
| 10,134,070 | B2 * | 11/2018 | Wadley | H04L 67/52 |
| 10,313,404 | B2 * | 6/2019 | Ein-Gil | H04L 67/51 |
| 11,245,609 | B2 * | 2/2022 | Coupal | H04L 25/03878 |
| 11,381,984 | B2 * | 7/2022 | Raghuramu | H04L 63/102 |
| 12,348,568 | B1 * | 7/2025 | Cheng | H04L 43/04 |
| 2016/0155077 | A1 * | 6/2016 | Lin | G06Q 10/06393 |
| | | | | 705/7.39 |
| 2016/0255139 | A1 * | 9/2016 | Rathod | H04L 51/046 |
| | | | | 709/203 |
| 2017/0195891 | A1 * | 7/2017 | Smith | H04W 4/24 |
| 2021/0350799 | A1 * | 11/2021 | Hansen | H04L 65/1069 |
| 2024/0283700 | A1 * | 8/2024 | Liu | H04L 41/0806 |

OTHER PUBLICATIONS

Nouri, et al.,"Supporting Complex Tasks Using Multiple Devices," Proceedings of WSDM'19 Task Intelligence Workshop, Feb. 15, 2019, pp. 1-6.

Summons to attend oral proceedings pursuant to Rule 115(1) Received for European Patent Application No. 20711679.9, mailed on Mar. 14, 2024, 13 pages.

Second Office Action Received for Chinese Application No. 202080017369.7, mailed on May 25, 2024, 7 pages (English Translation Provided).

Notice of Allowance Received for Chinese Application No. 202080017369.7, mailed on Dec. 17, 2024, 04 pages (English Translation Provided).

Brief Communication about oral proceedings Received for European Patent Application No. 20711679.9, mailed on Oct. 16, 2024, 5 pages.

Decision to refuse Received for European Patent Application No. 20711679.9, mailed on Dec. 16, 2024, 25 pages.

Intimation of Grant Received for Indian Application No. 202117038725, mailed on Jul. 23, 2024, 1 page.

* cited by examiner

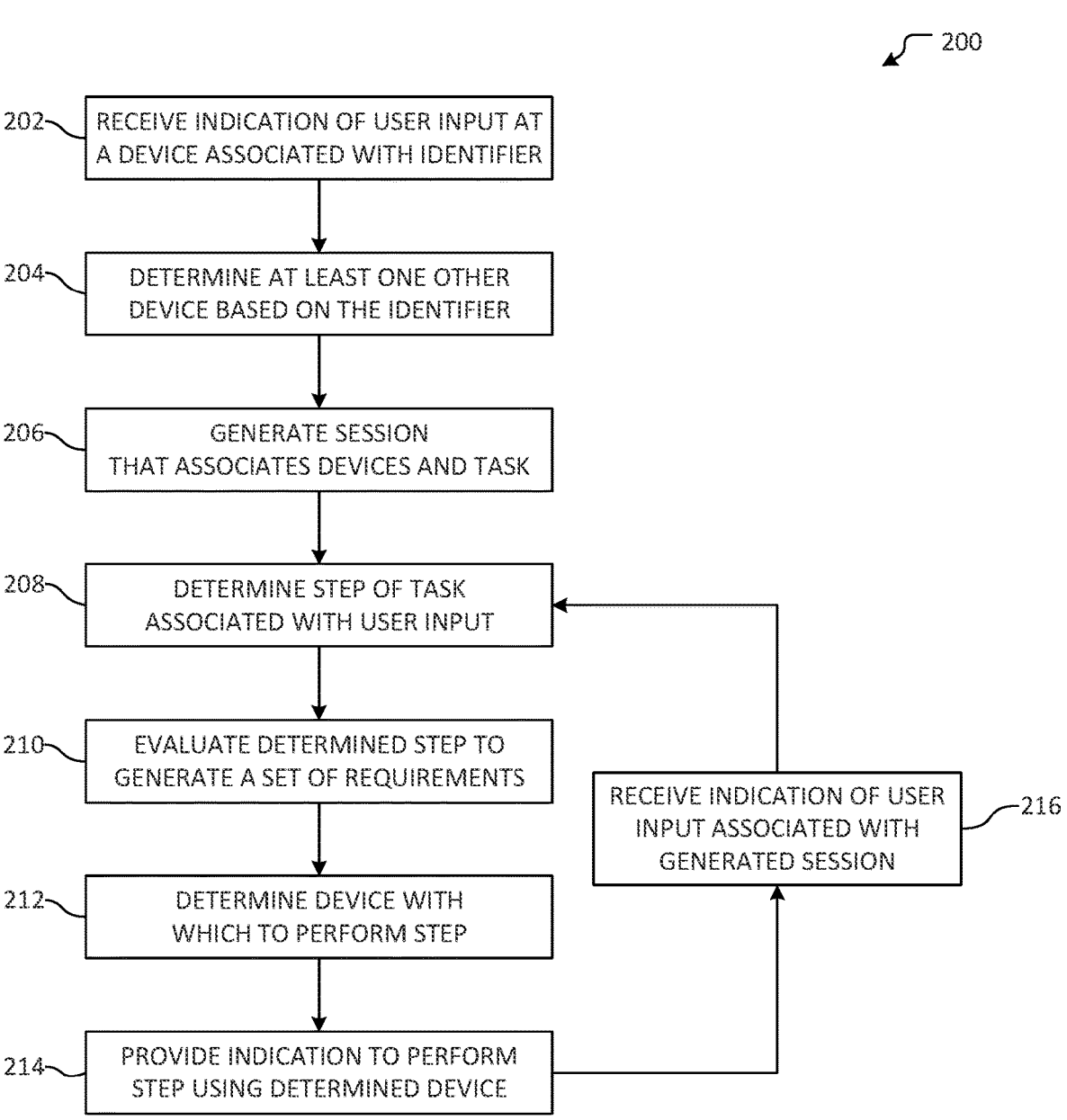

200

202 — RECEIVE INDICATION OF USER INPUT AT A DEVICE ASSOCIATED WITH IDENTIFIER

204 — DETERMINE AT LEAST ONE OTHER DEVICE BASED ON THE IDENTIFIER

206 — GENERATE SESSION THAT ASSOCIATES DEVICES AND TASK

208 — DETERMINE STEP OF TASK ASSOCIATED WITH USER INPUT

210 — EVALUATE DETERMINED STEP TO GENERATE A SET OF REQUIREMENTS

212 — DETERMINE DEVICE WITH WHICH TO PERFORM STEP

214 — PROVIDE INDICATION TO PERFORM STEP USING DETERMINED DEVICE

216 — RECEIVE INDICATION OF USER INPUT ASSOCIATED WITH GENERATED SESSION

222 — RECEIVE SET OF TASK REQUIREMENTS

224 — ACCESS DEVICE PROFILES

226 — EVALUATE DEVICE HARDWARE CHARACTERISTICS

228 — EVALUATE DEVICE CAPABILITIES

230 — EVALUATE HISTORICAL DEVICE INFORMATION

232 — GENERATE RANKING FOR DEVICES USING EVALUATED FACTORS

234 — SELECT DEVICE TO PERFORM STEP BASED ON GENERATED RANKING

700

USER INTERACTION AND TASK MANAGEMENT USING MULTIPLE DEVICES

CROSS-REFERENCE TO RELATED APPLICATIONS

This application is a continuation of U.S. patent application Ser. No. 17/880,290, filed on Aug. 3, 2022, now U.S. Pat. No. 11,895,214, issued on Feb. 6, 2024, which is a continuation of U.S. patent application Ser. No. 16/290,445, filed on Mar. 1, 2019, now U.S. Pat. No. 11,438,435, issued on Sep. 6, 2022, the entire disclosures of all are hereby incorporated by reference.

BACKGROUND

With the increased prominence and variety of computing devices, a user may have multiple devices with which a task can be performed. However, some computing devices may be better-suited for some tasks than other computing devices. Further, in some instances, a computing device that is well-suited for one step of a task may not be as well-suited for another step of the task.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present disclosure provides systems and methods for user interaction and task completion using multiple devices. In examples, a task is comprised of one or more steps. Accordingly, a set of devices may be used to perform a task, such that different devices may perform different steps. A device management service may update state information at each device of the set, thereby enabling a user to interact with any of the computing devices when performing steps of the task. For example, information entered or changed by the user at one device is made available to the other devices, thereby enabling the user to complete aspects of the task at any of the other devices.

A device management service may also automatically determine which device should be used by the user, based on task or step requirements, device characteristics, and device capabilities, among other examples. As a result, the computing device that received the initial user input relating to a step may not be the computing device used to interact with the user as the user performs the step. Thus, rather than being required to complete a task using only the same device (even when the device is not well-suited for the current step or task), the user is provided with the option to use and, in some instances, is automatically transitioned to use, different devices within the set.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2A illustrates an overview of an example method for managing a task session using multiple devices.

DETAILED DESCRIPTION

Figure 1:
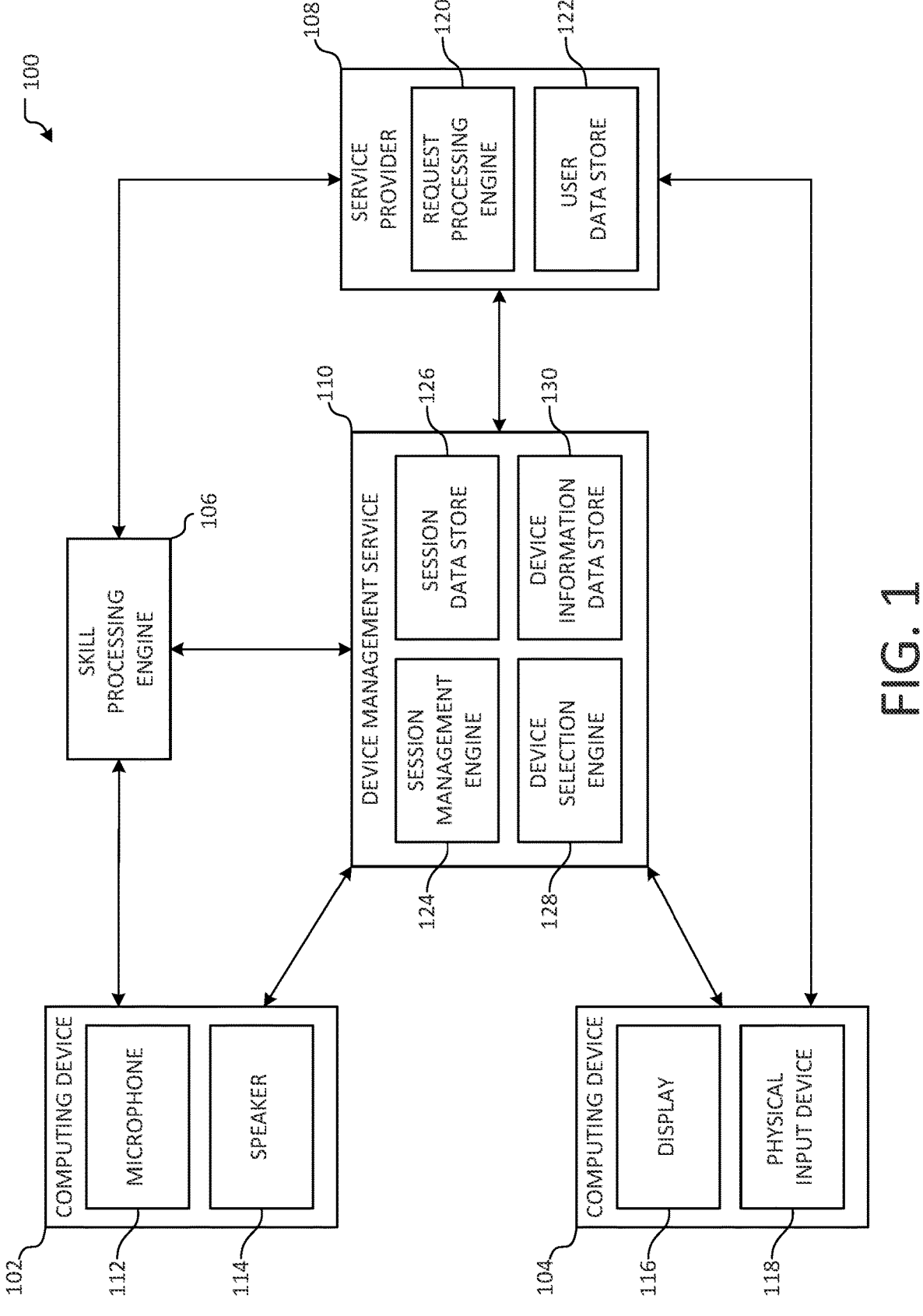
FIG. 1 illustrates an overview of an example system for user interaction and task completion using multiple devices.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Traditionally, users use a single computing device to initiate and subsequently perform a task to completion. For example, a user may use a voice command computing device to converse with a voice assistant in order to obtain information, send a message, or set a timer, among other examples. During the conversation, the user may answer voice prompts and receive information in the form of auditory responses from the voice assistant. As another example, a user may use a laptop computing device or tablet computing device to interact with graphical elements when performing a task, for example to select seats for a movie showing, make reservations at a geographically convenient and/or well-reviewed restaurant for dinner, or shop for items from an online retailer.

However, given that voice inputs are traditionally used as the primary or only input method to control a voice command computing device, the voice command computing device may not be well-suited to perform tasks that would typically be performed using a computing device having a display, touchscreen, mouse, and/or keyboard. As a result, performing such tasks using the voice command computing device may be frustrating, difficult, and time-consuming. Conversely, there may be tasks for which the voice command computing device is better-suited, such that using the voice command computing device may avoid user frustration, reduce task complexity, or decrease task duration. In other examples, a subset of steps associated with a task may be better-suited for one device, whereas a different subset of steps may be better-suited for a different device, as a result of differing device characteristics and capabilities, among other examples. It will be appreciated that the above combination of computing devices is provided as an example, and arrangements of devices with varying capabilities may be used without departing from the aspects described herein.

Accordingly, the present disclosure provides systems and methods for user interaction and task completion musing multiple devices. As used herein, a task is comprised of one or more steps. A task may comprise a set of discrete steps or, in other examples, steps of a task may be implicit or inferred. In examples, a set of devices is used to perform a task, wherein a device management service evaluates a given step of the task to determine which device or devices should be used to interact with the user. As an example, the device management service evaluates various factors, including, but not limited to, task or step capability requirements, device characteristics, device capabilities, device proximity to the user, user preferences, historical device usage or success rates for performing similar steps, and/or the ease with which a step may be completed using a given device. Additionally, when a user interacts with one of the devices in the set, the device management service may generate a state information update that is provided to each of the other devices. For example, information entered or changed by the user at one device is made available to the other devices, thereby enabling the user to perform different aspects of the task at any of the other devices. Thus, rather than being required to complete a task using only the same device (even when the device is not well-suited for the current step or task), the user is provided with the option to use and, in some instances, is automatically transitioned to use, different devices within the set. In addition to using a different computing device, it will be appreciated that any number of devices may be used to complete a step or task. As an example, the device management service may select a set of devices having the requisite capabilities to complete a task, such that the set of devices in aggregate provide the necessary capabilities, even though no one device has all of the necessary capabilities.

In examples, a set of devices is associated using a task session. The task session may be initialized when a user begins a task and may associate the set of devices while the user completes the task. As an example, each device in the set may be associated with an identifier, thereby enabling a device management service to identify devices within a set accordingly. Example identifiers include, but are not limited to, a user account identifier (e.g., username, email address, account number, etc.), one or more an internet protocol (IP) or media access control (MAC) addresses, a set of device hardware characteristics and/or device capabilities, a set of device names (e.g., as may be defined by a user, automatically generated, etc.), or a globally unique identifier (GUID). It will be appreciated that the identifier may be pre-associated with a device, or may be associated with the device as part of the initialization process. For example, a Quick Response (QR) code may be used to provide an identifier to devices that should be part of a set during the initialization process. Other techniques may be used to determine the set of devices in addition to or as an alternative to the techniques described herein, including, but not limited to, radio device detection (e.g., Bluetooth, Wi-Fi, etc.), network broadcasting/scanning, or using audio and/or light signals. While the examples are described in the context of session initialization, it will be appreciated that similar techniques may be used to add a device to an existing session.

Before a task session is initialized, a device may provide pre-session contextual information to a device management service. The device management service may use such information when initializing a session or during a session, among other examples. For example, contextual information regarding a webpage accessed by a computing device or a skill accessed by a voice command computing device may be provided to the device management service. Example contextual information includes, but is not limited to, a title (e.g., of a webpage, of a skill, etc.), a description, a Uniform Resource Locator (URL) associated with accessed content, and/or data provided to or received from the user. As a result, when a session is initialized, the device management service may use the contextual information to identify one or more devices to include in the set of devices for the session, as the device management service is able to automatically determine that such computing devices have previously been used in a manner that is related to the task. As another example, the device management service may use the contextual information to identify a task for which the session is initialized and/or pre-populate data within a task. It will be appreciated that pre-session contextual information may be received from any number of computing devices, such that the device management service may aggregate and process such information accordingly.

As used herein, a service provider provides functionality or content usable by a computing device. As an example, a service provider distributes an application that may be executed by a computing device. In another example, a service provider provides a skill processing engine, such that a smart speaker computing device (which may or may not be manufactured by the service provider) is able to interact with the skill processing engine in order to access content or functionality of the service provider. Other examples include, but are not limited to, web applications, smart home services, content streaming services, as well as content creation and/or distribution platforms.

FIG. 1 illustrates an overview of an example system 100 for user interaction and task completion using multiple devices. As illustrated, system 100 comprises computing device 102, computing device 104, skill processing engine 106, service provider 108, and device management service 110. In examples, aspects of system 100 are connected using a computer network, such as the Internet, a wired network, or a wireless network, or any combination thereof. It will be appreciated that while system 100 is described herein with respect to computing device 102 and computing device 104, any number of computing devices may be used. Additionally, while various features are discussed with respect to elements 102-130, it will be appreciated that, in other examples, certain features may be combined or different elements may comprise different features. For example, service provider 108 may incorporate aspects of the functionality discussed herein with respect to skill processing engine 106 and/or device management service 110, among other examples.

In examples, device management service 110 facilitates user interaction and task completion using computing devices 102 and 104 according to aspects described herein. In an example, computing device 104 enables a user to access a service provided by service provider 108. As another example, a user interacts with skill processing engine 106 using computing device 102 to access functionality provided by service provider 108. Traditionally, such user interactions are not associated, such that a user that begins a task at computing device 102 would be unable to perform aspects of the task at computing device 104, or vice versa. By contrast, device management service 110 communicates state information to computing devices 102 and 104 relating to user interactions with service provider 108, and, in some instances, determines which device (e.g., either computing device 102 or computing device 104) should be used to interact with the user. In other examples, user is able to provide an indication as to which device should be used. As another example, the user interacts with either device at the user's discretion. As a result, the user is able to perform aspects of a task on either computing device and, in some instances, the device that is well-suited for the task may be automatically determined for the user.

As illustrated, computing device 102 comprises microphone 112 and speaker 114. In some examples, computing device 102 is a voice command computing device, wherein a primary method of user input is using voice commands received using microphone 112 and a primary method of output is using auditory responses provided using speaker 114. For example, computing device 102 may be a smart speaker computing device, a smart remote of a television, a controller of a video game console computing device, a smartwatch, or any of a variety of other computing devices. In some instances, a voice command computing device comprises a display and/or a touch screen, thereby enabling alternative mechanisms to convey information to a user and/or receive user input. While computing device 102 is illustrated as comprising one microphone 112 and one speaker 114, it will be appreciated that any number of such elements and other hardware characteristics may be used.

Computing device 102 communicates with skill processing engine 106 to process user inputs and provide responses. As used herein, a skill enables a user to interact with functionality provided by a service provider. For example, a skill may comprise a voice user interface (VUI) with which a user is able to request information and answer prompts, thereby controlling computing operations using auditory interactions. In examples, third-party developers may provide a skill using an application programming interface (API) provided by a service provider. In some examples, skill processing engine 106 communicates with service provider 108 to access data, perform remote computations, and/or manipulate user data, among other examples. In other examples, skill processing engine 106 need not communicate with service provider 108 to process a request from computing device 102. It will be appreciated that, in some instances, at least a part of the processing performed by skill processing engine 106 described herein may instead be performed by a different element of system 100, such as computing device 102, service provider 108, and/or device management service 110.

Computing device 104 is illustrated as comprising display 116 and physical input device 118. Computing device 104 may be a mobile device, a tablet device, a desktop computing device, a laptop computing device, a smart home device, or any of a variety of other devices. Computing device 104 is provided as an example of a different computing device having different device characteristics and different capabilities as compared to computing device 102. For example, where computing device 102 provides a VUI with which to interact with a user, computing device 104 may instead provide a graphical user interface (GUI) as a primary user interaction mechanism. As an example, the user may interact with a GUI displayed by computing device 104 on display 116 using physical input device 118. Example physical input devices include, but are not limited to, a keyboard, a mouse, a touchscreen, one or more hardware buttons, and components for sensing gestures or other actions of the user (e.g., using computer vision techniques, proximity sensors, etc.). In an example, computing device 104 comprises a web browser application, which enables a user to access Internet content (e.g., as may be provided by service provider 108). In another example, computing device 104 executes a native application, which may be provided by service provider 108.

While computing devices 102 and 104 are discussed with respect to example device types (e.g., a smart speaker computing device, a smartwatch, a laptop computing device, a device having a physical input device, a device without a screen, etc.), it will be appreciated that, in other examples, any of a variety of other computing devices may be used, each of which may have varying device characteristics and/or capabilities. Example computing devices include, but are not limited to, a mobile device, a tablet device, a desktop computing device, a laptop computing device, a server computing device, a distributed computing device, a smart watch computing device, a smart home or Internet of Things (IoT) computing device, a smart speaker computing device, or a smart television, a video game console computing device, among other examples.

Additionally, it will be appreciated that example device characteristics are described herein, and other examples of device characteristics include, but are not limited to, storage space, quantity of random access memory (RAM), the availability and/or type of specialized processing hardware (e.g., a graphics processing unit, a field-programmable gate array, neural network hardware, a hardware cryptography engine, video encoding/decoding hardware, etc.), available communication modules (e.g., Wi-Fi, Bluetooth, Ethernet, USB, etc.), display characteristics (e.g., presence or absence of a display, display size, pixel density, display technology type, etc.), the presence or quantity of available speakers, microphones, and/or cameras, and/or the presence or type of available input devices (e.g., physical input devices, voice input, etc.). Example device capabilities include, but are not limited to, an ability to communicate information discreetly or privately to a user, an ability to move within a user's environment, an ability to playback video content, an ability to execute a machine learning model, an ability to identify a hot word or other invoking action and process subsequent input accordingly, or an ability to provide notifications to a user, an ability to control a user's environment (e.g., manage one or more lights, adjust room temperature, etc.). Thus, as compared to device characteristics, device capabilities instead relate to the functionality offered by a device rather than the device characteristics used to provide such functionality. Information relating to device characteristics and/ or device capabilities may be stored in a device profile, as described herein.

Service provider 108 provides a service that is accessed by computing device 102 and computing device 104, as described above. As an example, service provider 108 may provide content and functionality via the Internet, which may be accessed using a web browser, a native application, or a VUI (e.g., via skill processing engine 106), among other techniques. Service provider 108 comprises request processing engine 120 and user data store 122. In an example, request processing engine 120 processes requests from computing device 104 and skill processing engine 106. For example, request processing engine 120 may process requests from computing device 102 and computing device 104 (e.g., in the form of requests for web content, requests from a native application, requests via skill processing engine 106, etc.), and may communicate with user data store 122 (e.g., to access, modify, delete, and/or add data stored therein). User data store 122 may store user information, as may be received or generated by request processing engine 120. Examples include, but are not limited to, account information (e.g., usernames, email addresses, hashed passwords, etc.), user-generated content, and other data used by service provider 108 in providing the service.

As illustrated, device management service 110 is comprised of session management engine 124, session data store 126, device selection engine 128, and device information data store 130. Session management engine 124 manages a set of computing devices associated with one or more tasks according to aspects described herein. As an example, session management engine 124 receives state updates from computing device 102 and/or computing device 104, such that updated state information is provided or otherwise made available to other devices in the set accordingly. In some examples, contextual information relating to computing device 102 and/or computing device 104 may be received prior to the initialization of a session, such that the contextual information may later provide context for a session. In another example, session management engine 124 initializes and manages a task session that associates a set of devices (e.g., computing device 102 and computing device 104).

Accordingly, session management engine 124 enables a user to use the set of computing devices to perform different steps of the task. As described herein, devices may be selected automatically, at the direction of the user, or the user may select a device, among other examples. In some examples, session management engine 124 communicates with device selection engine 128 to determine a device that the user interacts with to perform a step of a task, as discussed in greater detail below. As another example, a user may be using an initial device to perform a step, while device management service 110 may determine that a different device should be used. Accordingly, an indication may be provided to the user at the initial device, such that the user may choose to switch to the different device. In some instances, rather than switching from the initial device to the different device, both devices may be used. If device management service 110 identifies a device type that the user does not currently own, a recommendation to purchase such a device may be presented to the user. While example task sessions may be described with respect to a single task, in other examples it will be appreciated that a task session may associate a set of devices for multiple tasks.

Session data store 126 may be used by session management engine 124 to store contextual information, state information, and information relating to potential, active, and/or past task sessions. For example, when a session state update is received from a computing device, session management engine 124 may store information relating to the session state update in session data store 126. Such state information may then be used to determine a task associated with a task session, to pre-populate data needed for a task, and to provide state updates to other computing devices, among other examples. Example session state information includes, but is not limited to, a session or user account identifier for a service provider (e.g., service provider 108), at least a part of a user input received at a computing device, at least a part of a response generated based on a user input, or data relating to a user action (e.g., a recently accessed web page, a recently used skill, a recently contacted contact, a missed phone call, etc.).

Device selection engine 128 evaluates a set of factors to determine one or more devices from a set of devices that are used to interact with a user as part of a task. In examples, device selection engine 128 and session management engine 124 communicate, such that a device determination made by device selection engine 128 is used by session management engine 124 to assign a specific computing device to a given step of a task. Thus, while examples herein are described with respect to selecting and assigning a single device to a step of a task, it will be appreciated that, in other examples, multiple devices are selected such that each device of the selected device is used to perform different aspects of the step. Example factors include, but are not limited to, task or step capability requirements (e.g., the availability of a display, the ability to receive voice input, the ability to provide video playback, etc.), computing device characteristics, computing device capabilities, device proximity to the user, user preferences, historical device usage or success rates for performing similar steps, and/or the ease with which a step may be completed using a given device. In some examples, a task or a step may provide an indication as to a type of device, device characteristics, device capabilities, and/or available capabilities that are required and/or recommended.

Device information data store 130 stores information relating to the factors described herein. For example, device information data store 130 stores user preference information, which may indicate one or more mappings between a task type and a general type of computing device or a computing device having certain capabilities. In some examples, a mapping indicated by a user preference may be between a task type and a specific computing device. It will be appreciated that, in other examples, a mapping may associate multiple devices with a task and/or step. For example, the devices associated with a task requiring user input may comprise one device having a display to in order to present information to the user, as well as another device implementing a VUI with which to receive the user input, such that both devices are used when completing the task. As another example, device information data store 130 stores one or more device profiles. As used herein a device profile comprises information relating to a computing device, such as device characteristics, device capabilities, proximity to the user, and/or battery charge state (e.g., a percentage of charge, charging, draining, not present, etc.), among other examples.

In other examples, device information data store 130 stores historical device usage or success rate information, wherein the historical device usage information may relate to a specific user and/or may relate to a larger population of users. As an example, population device usage information may be used when user-specific usage information is unavailable (e.g., as may be the case when the user is new, has recently purchased a new device, etc.). Success rate information describe how effective (e.g., based on user satisfaction, completion time, accuracy, etc.) a type of device is for performing a type of task. Such information may be collected based on an analysis of user survey information and/or usage data provided from computing devices on which a user has opted-in to such data collection.

FIG. 2A illustrates an overview of an example method 200 for managing a task session using multiple devices. In examples, aspects of method 200 are performed by a device management service, such as device management service 110 in FIG. 1. Method 200 begin at operation 202, where an indication of user input at a computing device is received. In examples, the indication is received directly from the computing device (e.g., computing devices 102 and 104 in FIG. 1), from a service provider (e.g., service provider 108), from a skill processing engine (e.g., skill processing engine 106), or from any of a variety of other sources. In examples, the indication comprises an identifier associated with the computing device. Example identifiers include, but are not limited to, a user account identifier, one or more IP or MAC addresses, a set of device hardware characteristics and/or device capabilities, a set of device names, or a GUID. Method 200 is described in an example where the identifier is pre-associated with the computing device. In other examples, it will be appreciated that the identifier may be requested or otherwise received from a computing device in a separate step according to aspects described herein.

At operation 204, at least one other computing device is determined based on the received identifier. In examples, pre-session contextual information received from a computing device may be evaluated to identify an association between a computing device and the identifier received at operation 202. As discussed herein, pre-session contextual information may be stored by a session data store, such as session data store 126 in FIG. 1. In an example where the identifier is a user account identifier, other computing devices may have been previously associated with the user account identifier. In some instances, device proximity information may be evaluated, such that the determined computing device is a computing device that is proximate to the user (e.g., in the same room, within arm's reach, within speaking distance, etc.). In other instances, a user may provide an explicit indication as to one or more devices that should be included in a set. Other evaluations may be used to determine the other devices, such as evaluating device profiles (e.g., as may be stored by a device information data store, such as device information data store 130 in FIG. 1), historical device usage information, etc.

Moving to operation 206, a task session is generated that associates the computing device from operation 202 and the at least one other computing device determined at operation 204 with a task. In examples, information relating to the session (e.g., the set of associated devices, one or more tasks associated with the session, etc.) is stored in a session data store, such as session data store 126 in FIG. 1. One or more tasks associated with the task session may be determined by communicating with a service provider (e.g., service provider 108 in FIG. 1) or may be determined based off of information in the indication received at operation 202, among other examples.

Flow progresses to operation 208, where a step of the task associated with the user input is determined. In some examples, the indication received at operation 202 comprises an indication as to the step associated with the user input. In other instances, the step may be determined by communicating with a service provider, may be determined based on an analysis of the user input, or may be determined using state information stored in a session data store, among other examples.

At operation 210, the determined step is evaluated to generate a set of requirements. As described herein, in some instances a task and/or step may provide an indication as to required and/or recommended capabilities. In other examples, the set of requirements is determined based on evaluating actions, potential user inputs, potential outputs, and/or other information associated with the step. In such examples, the evaluation may comprise evaluating mappings between types of actions, inputs, outputs, and other information and preferred or required device capabilities. In other examples, historical device usage information may be evaluated.

Moving to operation 212, one or more processing computing devices for performing the step are determined. In some examples, aspects of operation 212 are performed by a device selection engine of a device management service, such as device selection engine 128 of device management service 110 in FIG. 1. As described herein, the determination comprises analyzing a set of factors associated with the devices of the task session in view of the set of requirements determined at operation 210. Example factors include, but are not limited to, computing device characteristics, computing device capabilities, device proximity to the user, user preferences, historical device usage or success rates for performing similar steps, and/or the ease with which a step may be completed using a given device. It will be appreciated that while operation 212 is described with respect to determining a device from the set of devices associated with the session, in other examples the set of devices may be ranked based on how well-suited each devices is in view of the requirements and factors, or the n highest-ranked devices may be determined, among other examples.

At operation 214, an indication is provided to the determined device (or, in some instances, the determined devices) to perform the step. In some instances, the indication comprises at least a part of the information received at operation 202 (e.g., user input, a task, a step, etc.). The indication may be provided directly to the computing device or may be provided via an intermediary (e.g., via a service provider, a skill processing engine, etc.), among other examples. It will be appreciated that, in some examples, multiple indications may be provided. For example, if it is determined that a step should be processed using a browser on a computing device, an indication may be provided to the computing device to open the browser to a webpage, while a second indication may be provided to a service provider, such that the service provider has information relating to the step, task, and/or session. For example, the webpage may be populated with data previously received from a user. As another example, a skill processing engine may receive state information, such that a user using a voice command computing device is able to reference the state information when conversing with the voice command computing device.

Eventually, flow may progress to operation 216, where another indication of user input is received, as is the case when the user performs another step in the task session. Accordingly, flow returns to operation 208, where a step associated with the user input is determined as discussed above. Thus, flow loops through operations 208, 210, 212, 214, and 216 as the user performs steps of the task using the set of devices with which the session is associated. Ultimately, flow terminates at operation 214.

Figure 2B:
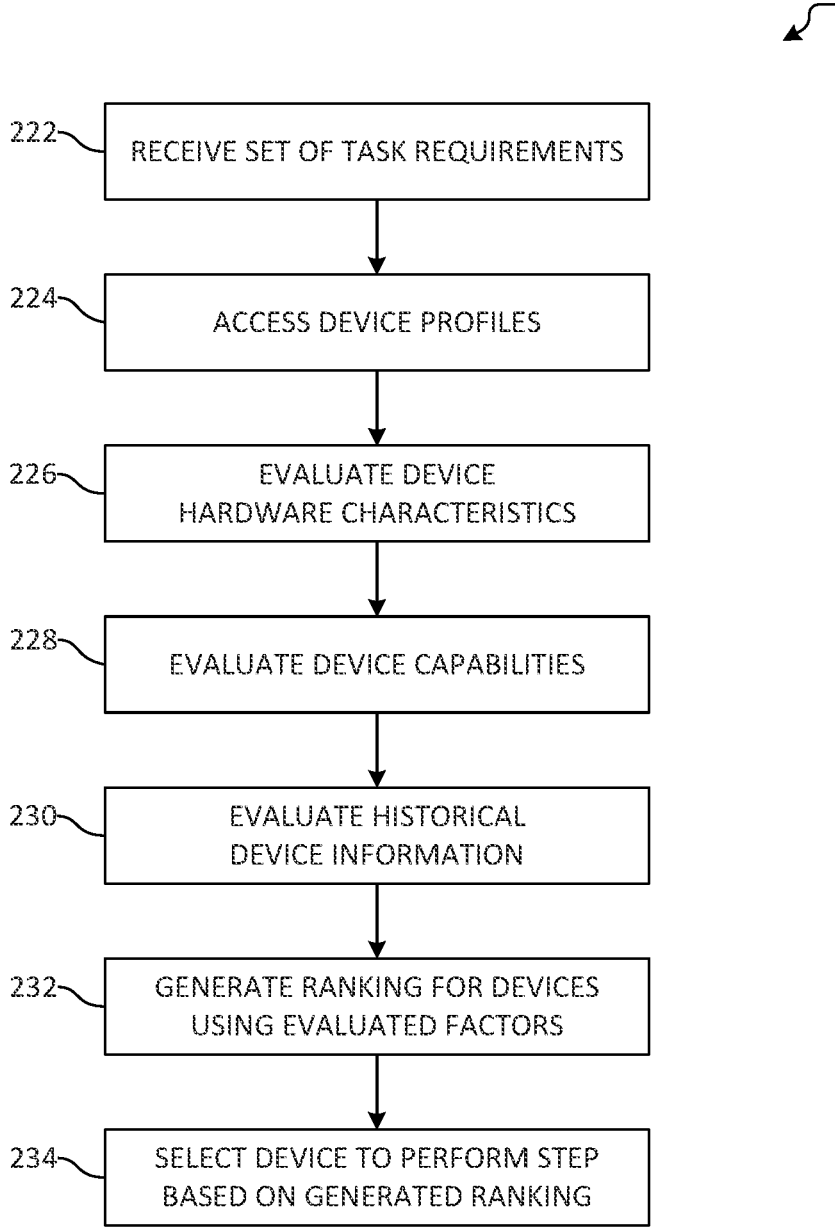
FIG. 2B illustrates an overview of an example method for selecting a device with which to perform a step of a task during a session.

FIG. 2B illustrates an overview of an example method 220 for selecting a device with which to perform a step of a task during a session. In examples, aspects of method 220 are performed by a device management service, such as device management service 110 in FIG. 1. For example, a device selection engine such as device selection engine 128 in FIG. 1 may be used. Method 220 begin at operation 222, where a set of step requirements is received. In an example, the set of step requirements may be determined by performing at least some of the aspects discussed above with respect to operation 210 in FIG. 2A. In another example, the set of step requirements is specified by a step and/or a task.

At operation 224, device profiles are accessed. For example, a device profile for each device of a set of devices associated with a session may be accessed. Device profiles may be accessed from a device information data store, such as device information data store 130 in FIG. 1. In other examples, device profiles may be associated with a user account for a user of the computing devices. While method 220 is described with respect to using device profiles, it will be appreciated that, in other examples, at least a part of the information contained within a device profile may instead be stored and accessed separately.

At operation 226, device hardware characteristics are evaluated. Example device hardware characteristics include, but are not limited to, storage space, quantity of RAM, the availability and/or type of specialized processing hardware, available communication modules, display, the presence or quantity of available speakers, microphones, and/or cameras, and/or the presence or type of available input devices. Such hardware characteristics are evaluated in view of the step requirements received at operation 222 to determine the extent to which the available devices satisfy the set of step requirements.

Flow progresses to operation 228, where device capabilities are evaluated. Example device capabilities include, but are not limited to, an ability to communicate information discreetly or privately to a user, an ability to move within a user's environment, an ability to playback video content, an ability to execute a machine learning model, an ability to identify a hot word or other invoking action and process subsequent input accordingly, an ability to provide notifications to a user, an ability to control a user's environment (e.g., manage one or more lights, adjust room temperature, etc.). Thus, as compared to hardware characteristics, device capabilities instead relate to the functionality offered by a device rather than the hardware characteristics used to provide such functionality. Such device capabilities are evaluated in view of the step requirements received at operation 222 to determine the extent to which the available devices satisfy the set of step requirements.

At operation 230, historical device usage information is evaluated. In examples, historical device usage information is accessed from a device information data store, such as device information data store 130 in FIG. 1. For example, such historical device usage information may relate to a specific user and/or may relate to a larger population of users. As an example, population device usage information may be used when user-specific usage information is unavailable (e.g., as may be the case when the user is new, has recently purchased a new device, etc.). Success rate information may describe how effective (e.g., based on user satisfaction, completion time, accuracy, etc.) a type of device is for performing a type of task having a set of step requirements. The historical device usage information may map a step requirement to one or more device hardware characteristics and/or device capabilities. Thus, the evaluations at operations 226 and/or 228 may be used in combination with the historical device usage information to identify one or more devices having characteristics and/or capabilities that satisfy the set of task requirements as indicated by the historical device usage information. In some instances, such information is used to generate and provide a recommendation to the user, wherein the recommendation indicates one or more devices that the user should consider purchasing in order to have a more capable set of devices available for task completion.

Moving to operation 232, a ranking is generated for the set of devices based on the factors evaluated at operations 226-230. In examples, the factors may be weighted or prioritized when ranking the set of devices. It will be appreciated that while example factors and evaluations have been described with respect to method 220, one or more evaluations may be omitted, or alternative or additional evaluations may be used. At operation 234, a device is selected to perform a step based on the generated ranking. In some examples, a set of device is selected, wherein the set comprises devices that rank above a predetermined threshold. Flow terminates at operation 234.

Figure 3A:
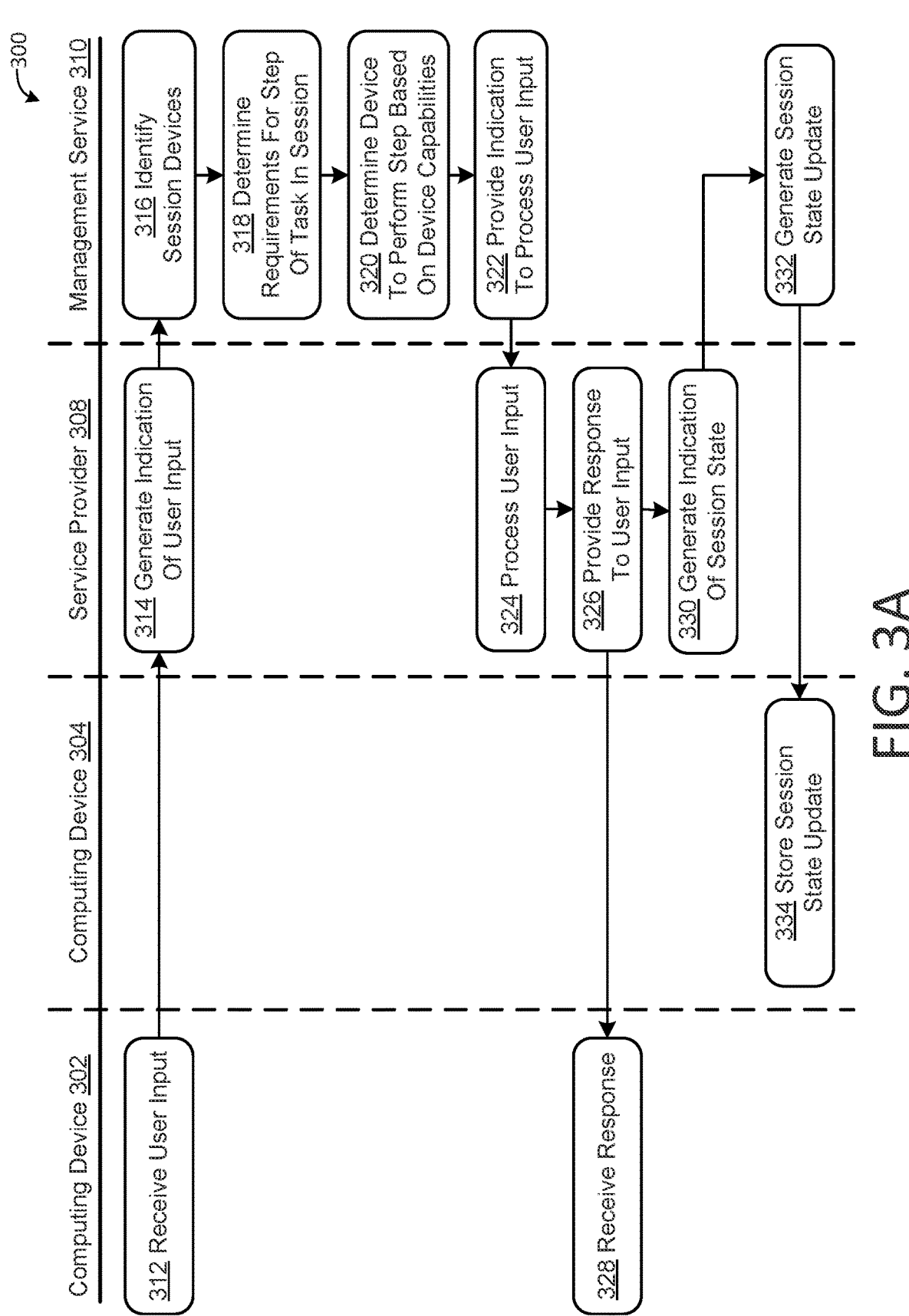
FIG. 3A illustrates an overview of an example process flow for processing user input relating to a session using multiple devices.

FIG. 3A illustrates an overview of an example process flow 300 for processing user input relating to a session using multiple devices. As illustrated, process flow 300 occurs between computing device 302, computing device 304, service provider 308, and management service 310, each of which may be similar to such elements discussed above. For example, computing device 302 and computing device 304 may have different characteristics and capabilities (e.g., as was the case for computing devices 102 and 104 in FIG. 1). In examples, service provider 308 may comprise a skill processing engine and/or a request processing engine, such as skill processing engine 106 and request processing engine 120 in FIG. 1.

Process flow 300 begins at operation 312, where a user input relating to a step of a task is received at computing device 302. As an example, computing device 302 may receive the user input in the form of a user interacting with a physical input device or issuing a voice command, among other examples. It will be appreciated that, while FIGS. 3A-3D are described with respect to a user input, other types of input may be received. For example, an input may comprise the arrival of a message, completion of a timer, delivery of a package, and/or an event in a video stream. An input may be any of a variety of asynchronous events (e.g., as may be detected by a sensor, received from a server, generated by an application, etc.). The arrow from operation 312 to operation 314 indicates that information relating to the user input is provided to service provider 308. As an example, the user input may be the submission of a webpage to process using a request processing engine, or may be a voice utterance that is provided to service provider 308 to process using a skill processing engine. It will be appreciated that, in some examples, the user input may alternatively or additionally be processed at computing device 302 or by any of a variety of other computing devices and/or processing engines.

At operation 314, an indication of the user input is generated and provided to management service 310. In examples, the indication may comprise an identifier associated with computing device 302. As discussed herein, the identifier may be associated with an ongoing session. Thus, using the identifier, management service 310 identifies the set of session devices associated with the task at operation 316.

Moving to operation 318, step requirements are determined for the step of the task that the user is performing. In examples, the determination comprises performing aspects of operation 210 discussed above with respect to FIG. 2A. For example, the task and/or step may provide an indication as to required and/or recommend capabilities. In other examples, the set of requirements is determined based on evaluating actions, potential user inputs, potential outputs, and/or other information associated with the step. As another example, management service 310 may communicate with service provider 308 to determine the requirements or service provider 308 may have provided the requirements as part of the indication generated at operation 314.

At operation 320, a processing computing device to perform the step is determined from the set of devices associated with the session. In an example, the determination comprises performing aspects of operation 212 discussed with respect to method 200 of FIG. 2A and/or aspects of method 220 discussed with respect to FIG. 2B. For example, the requirements determined at operation 318 are evaluated based on device capabilities, device proximity to the user, user preferences, historical device usage or success rates for performing similar steps, and/or the ease with which a step may be completed using a given device, among other examples. Accordingly, an indication to process the user input is provided to the determined device at operation 322.

As illustrated, the indication is provided to service provider 308, such that service provider 308 processes the user input at operation 324. In examples, the indication comprises session state information and/or at least a part of the user input, among other information. As an example, processing the user input may comprise manipulating data, generating a webpage, and/or generating a voice response, among other examples. Thus, process flow 300 is illustrated as providing the indication to service provider 308 rather than computing device 302, as computing device 302 provided the user input to service provider 308 at operation 312, such that service provider 308 is able to generate a response and respond accordingly. It will be appreciated that, in other examples, an indication is provided to a computing device, thereby causing the computing device to take action instead of or in addition to service provider 308. For example, sensitive data (e.g., camera input, financial information, passwords, etc.) may be stored locally by the computing device, such that only the computing device is able to process the sensitive data. Such an example is discussed below with respect to FIG. 3B.

At operation 326, a response to the user input is provided to computing device 302, which is received by computing device 302 at operation 328. As an example, receiving the response may comprise processing received webpage data in a web browser, using a speaker to play a received voice response, or updating the state of a native application, among other examples.

At operation 330, an indication of the current session state (e.g., as may have changed as a result of processing the user input at operation 324) is provided to management service 310. Accordingly, at operation 332, management service 310 generates a session state update notification, which is provided to other devices of process flow 300, which, as illustrated, is computing device 304. In some examples, management service 310 updates a session data store, such as session data store 126 in FIG. 1. Computing device 304 stores the session update at operation 334, which may be used by computing device 304 when processing subsequent user requests. Process flow 300 terminates at operation 334.

Figure 3B:
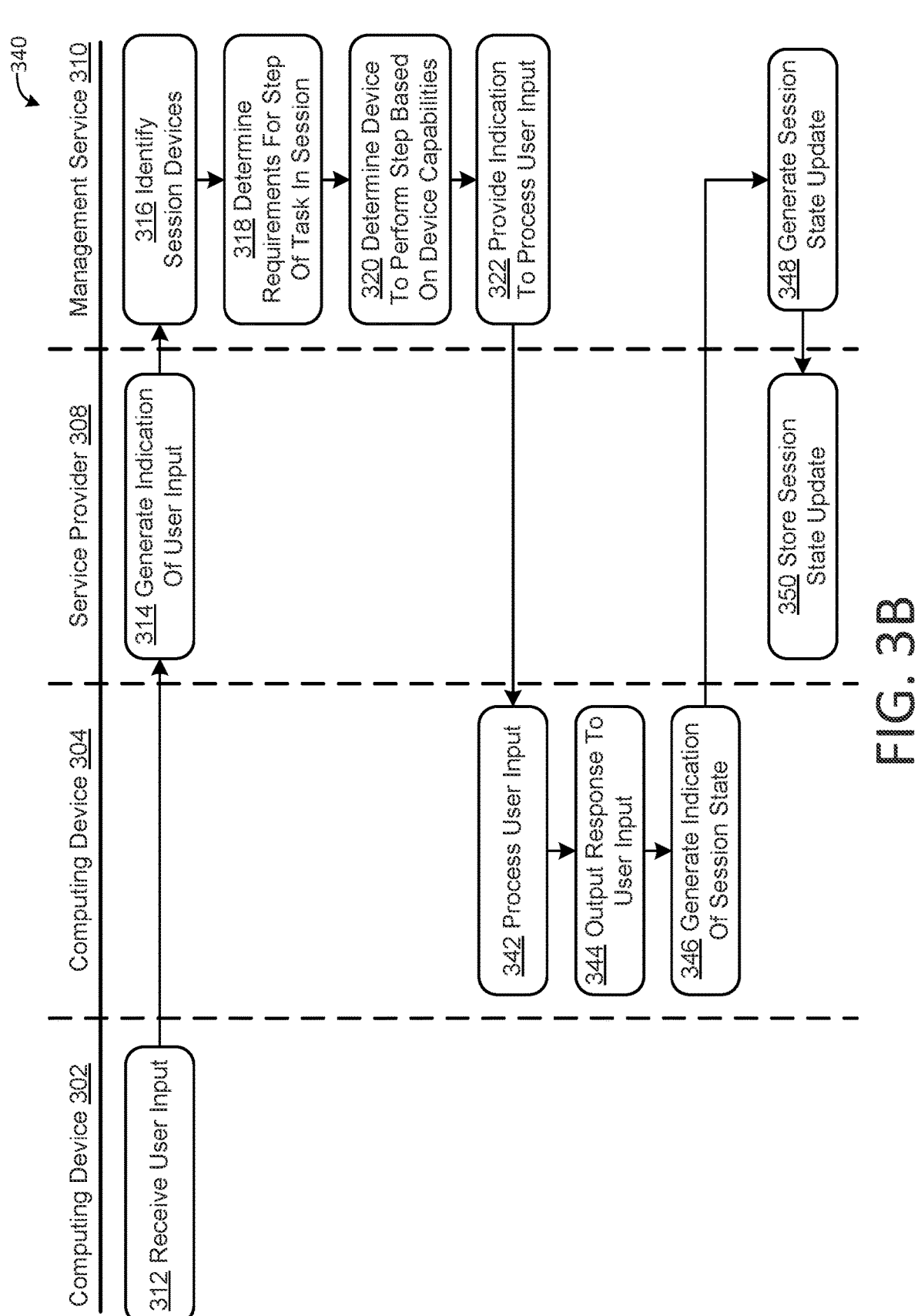
FIG. 3B illustrates an overview of an example process flow for processing user input relating to a session using multiple devices, wherein a different computing device processes the user input than where the user input was initially received.

FIG. 3B illustrates an overview of an example process flow 340 for processing user input relating to a session using multiple devices, wherein a different computing device processes the user input than where the user input was initially received. A number of elements depicted in FIG. 3B are described above in the context of FIG. 3A and, thus, are not necessarily described further. Operations 312-322 are similar to those discussed above with respect to FIG. 3A, however the indication to process the user input at operation 322 is provided to computing device 304 instead of service provider 308, as was the case in FIG. 3B. This is as a result of computing device 304 being the determined device at operation 320.

Thus, computing device 304 processes the user input at operation 342. In examples, the indication received from management service 310 comprises session state information and/or at least a part of the user input, among other information. Accordingly, computing device 304 may process the user input in view of the current state of the session and information relating to past steps that were previously performed by the user.

At operation 344, computing device 304 outputs a response to the user input. As an example, outputting the response may comprise updating the state of a native application, outputting a voice response using a speaker, or providing haptic feedback, among other examples.

At operation 346, an indication of the current session state (e.g., as may have changed as a result of processing the user input at operation 342) is provided to management service 310. Accordingly, at operation 348, management service 310 generates a session state update notification, which is provided to other devices of process flow 340, which, as illustrated, is service provider 308. In some examples, management service 310 updates a session data store, such as session data store 126 in FIG. 1. Service provider 308 stores the session update at operation 350, which may be used by service provider 308 when processing subsequent user requests. Service provider 308 is depicted as receiving the session state update to illustrate that updated state information need not be directly communicated to a computing device (e.g., computing device 302), but may instead be communicated to a computing device that performs operations on behalf of computing device 302. Such instances may include web services or instances in which a skill processing engine is used, among other examples. It will be appreciated, however, that in other instances, updated state information may be communicated to computing device 302 in addition to or as an alternative to communicating the updated state information to service provider 308. Process flow 340 terminates at operation 350.

Figure 3C:
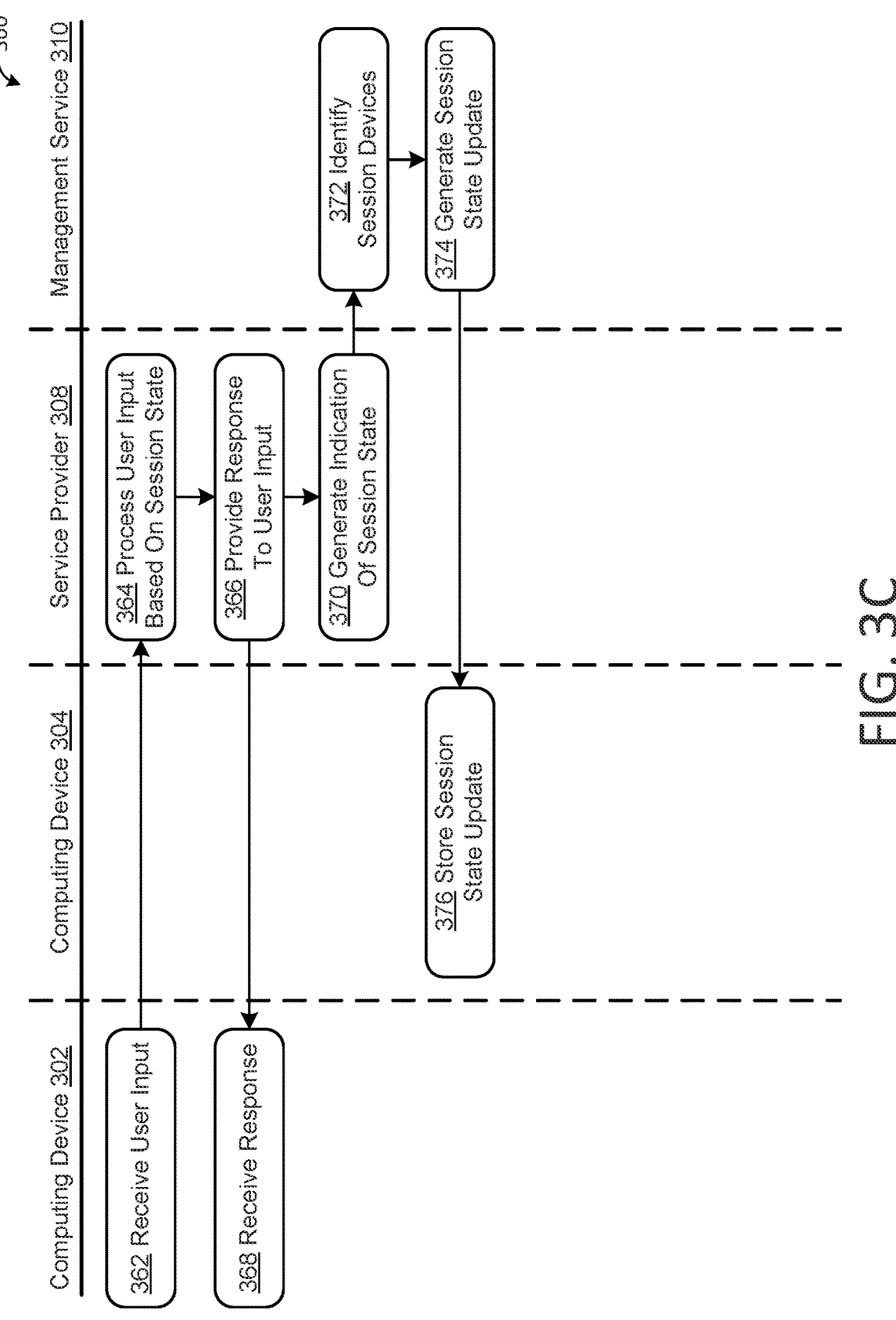
FIG. 3C illustrates an overview of an example process flow for communicating session state information in an example session with multiple devices.

FIG. 3C illustrates an overview of an example process flow 360 for communicating session state information in an example session with multiple devices. As a result of implementing aspects of process flow 360, a user is able to perform a subsequent step of a task using different devices within a set of devices associated with the session. A number of elements depicted in FIG. 3C are described above in the context of FIGS. 3A-3B and, thus, are not necessarily described further.

Process flow 360 begins at operation 362, where a user input is received. As an example, computing device 302 may receive the user input in the form of a user interacting with a physical input device or issuing a voice command, among other examples. The arrow from operation 362 to operation 364 indicates that information relating to the user input is provided to service provider 308. As an example, the user input may be the submission of a webpage to process using a request processing engine, or may be a voice utterance that is provided to service provider 308 to process using a skill processing engine. It will be appreciated that, in some examples, the user input be processed at least in part by computing device 302 prior to communicating the user input to service provider 308.

At operation 364, service provider 308 processes the user input. In examples, session provider 308 uses session state information (e.g., as may be received from a device management service according to aspects described herein). As an example, processing the user input may comprise manipulating data, generating a webpage, and/or generating a voice response, among other examples. Accordingly, at operation 366, a response to the user input is provided to computing device 302, which is received by computing device 302 at operation 368. As an example, receiving the response may comprise processing received webpage data in a web browser, using a speaker to play a received voice response, or updating the state of a native application, among other examples.

At operation 370, an indication of the current session state (e.g., as may have changed as a result of processing the user input at operation 364) is provided to management service 310. Accordingly, at operation 372, management service 310 identifies session devices to which updated state information should be provided. According to aspects described herein, management service 310 may identify a set of devices associated with the session using an identifier, such as a user account identifier, one or more IP or MAC addresses, a set of device hardware characteristics and/or device capabilities, a set of device names, or a GUID, among other examples.

Moving to operation 374, management service 310 generates a session state update notification, which is provided to other devices of process flow 300, which, as illustrated, is computing device 304. In some examples, management service 310 updates a session data store, such as session data store 126 in FIG. 1. Computing device 304 stores the session update at operation 376, which may be used by computing device 304 when processing subsequent user requests. Process flow 360 terminates at operation 376.

Figure 3D:
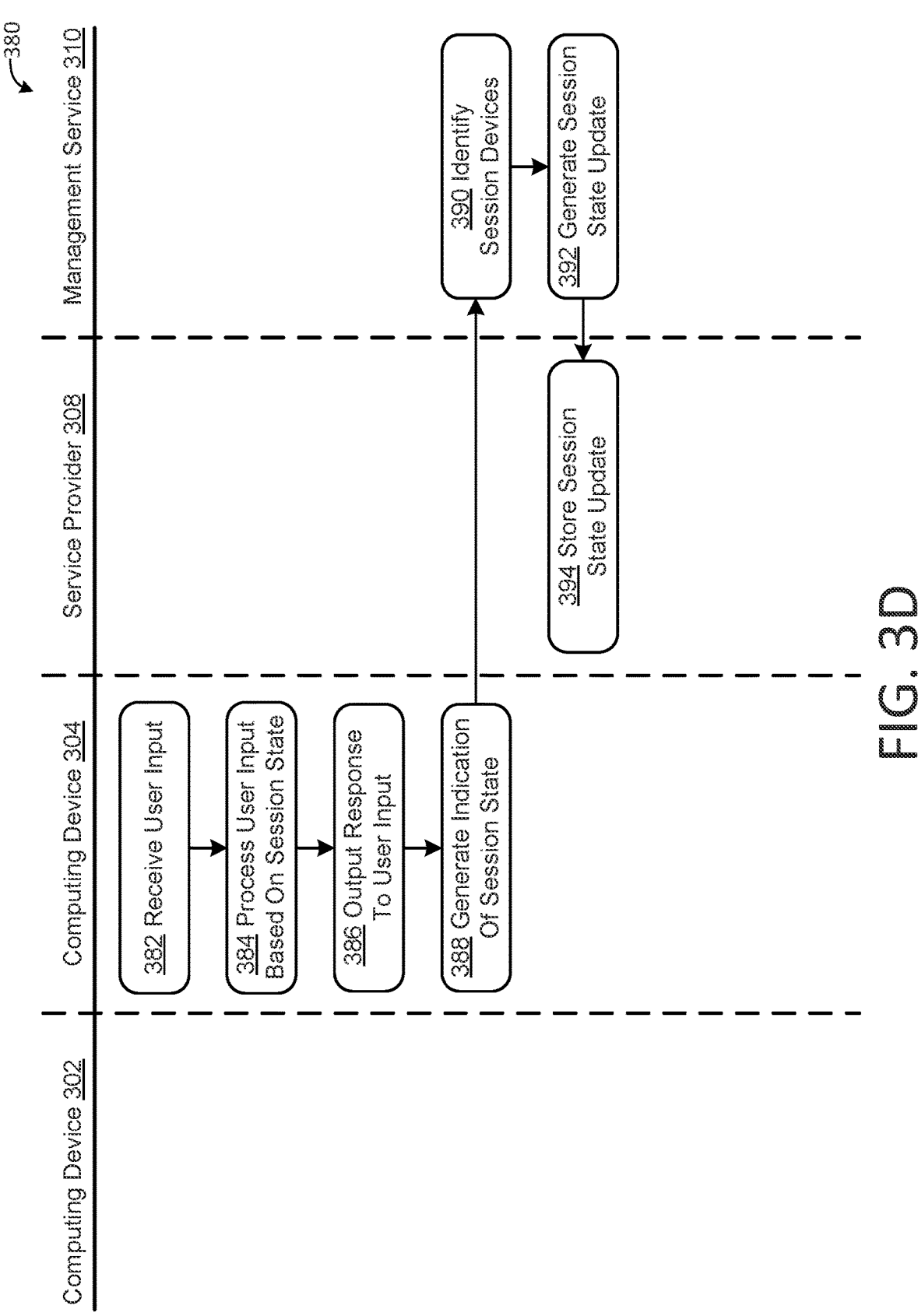
FIG. 3D illustrates an overview of an example process flow for communicating session state information in an example session with multiple devices.

FIG. 3D illustrates an overview of an example process flow 380 for communicating session state information in an example session with multiple devices. As a result of implementing aspects of process flow 380, a user is able to perform aspects of a task using different devices out of a set of devices that are associated with a session. A number of elements depicted in FIG. 3D are described above in the context of FIGS. 3A-3C and, thus, are not necessarily described further.

Process flow 380 begins at operation 382, where a user input is received. As an example, computing device 304 may receive the user input in the form of a user interacting with a physical input device or issuing a voice command, among other examples. At operation 384, computing device 304 processes the user input. In examples, computing device 304 uses session state information (e.g., as may be received from a device management service according to aspects described herein).

Accordingly, at operation 386, computing device 304 outputs a response to the user input. As an example, outputting the response may comprise updating the state of a native application, outputting a voice response using a speaker, or providing haptic feedback, among other examples.

At operation 388, an indication of the current session state (e.g., as may have changed as a result of processing the user input at operation 384) is provided to management service 310. Accordingly, at operation 390, management service 310 identifies session devices to which updated state information should be provided. According to aspects described herein, management service 310 may identify a set of devices associated with the session using an identifier, such as a user identifier, an IP or MAC address, a set of device hardware characteristics and/or device capabilities, a device name, or a GUID, among other examples.

Moving to operation 392, management service 310 generates a session state update notification, which is provided to other devices of process flow 300, which, as illustrated, is service provider 308. In some examples, management service 310 updates a session data store, such as session data store 126 in FIG. 1. Service provider 308 stores the session update at operation 394, which may be used by service provider 308 when processing subsequent user requests. Service provider 308 is depicted as receiving the session state update to illustrate that updated state information need not be directly communicated to a computing device (e.g., computing device 302), but may instead be communicated to a computing device that performs operations on behalf of computing device 302. Such instances may include web services or instances in which a skill processing engine is used, among other examples. It will be appreciated, however, that in other instances, updated state information may be communicated to computing device 302 in addition to or as an alternative to communicating the updated state information to service provider 308. Process flow 380 terminates at operation 394.

Figure 4:
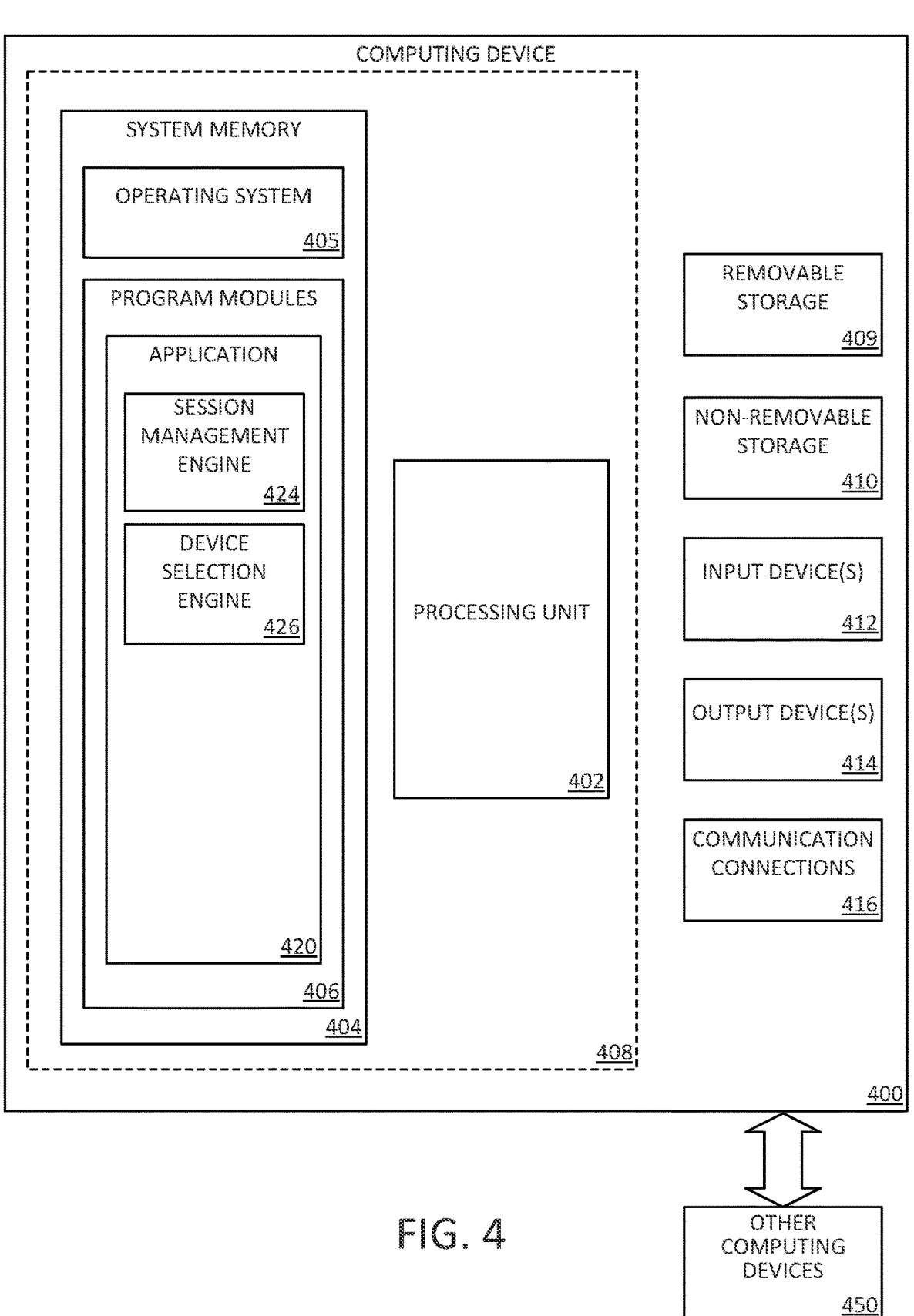
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for performing the various aspects disclosed herein, such as session management engine 424 and device selection engine 426. The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
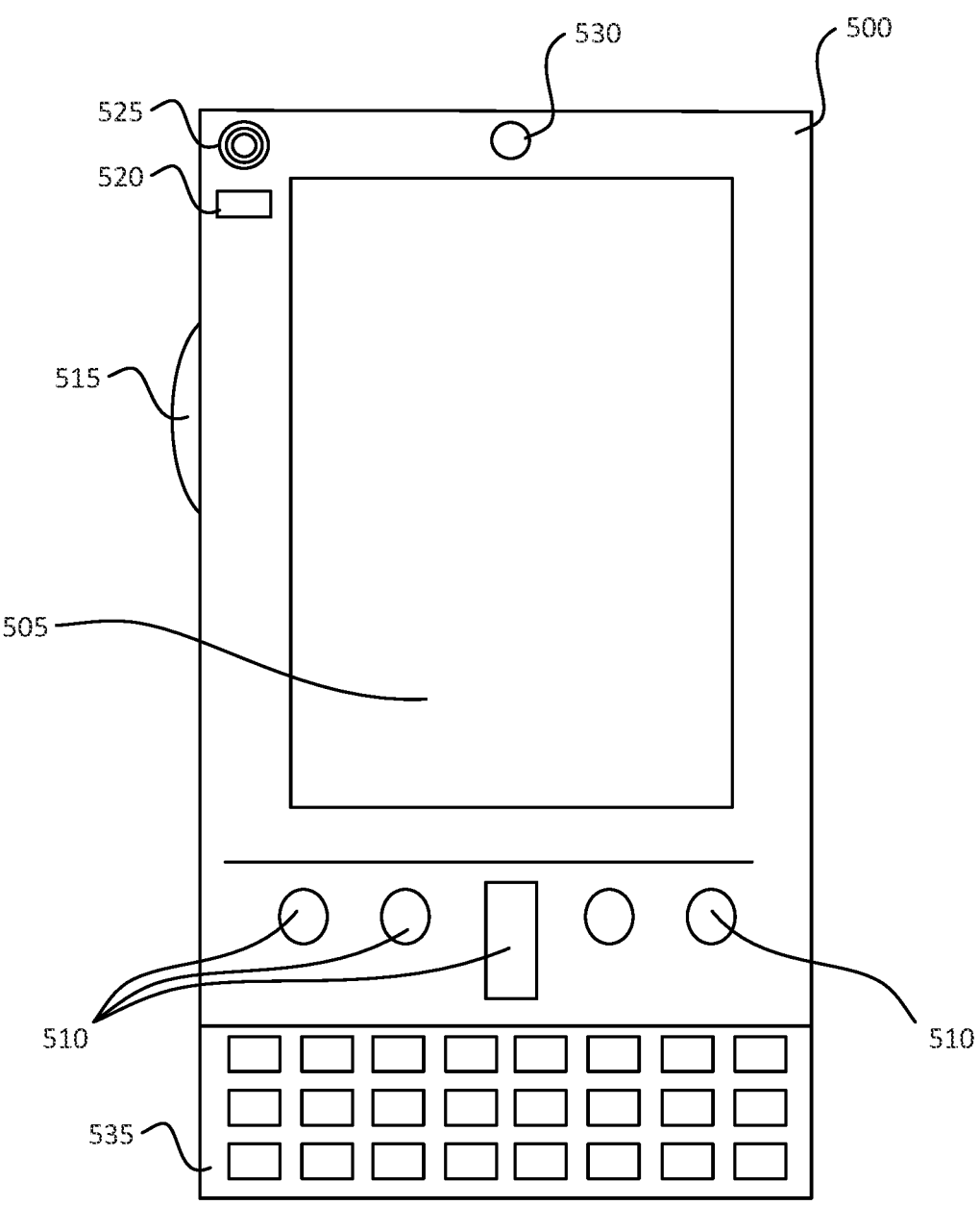
FIGS. 5A and 5B are simplified block diagrams of a mobile computing device with which aspects of the present disclosure may be practiced.
Figure 5B:
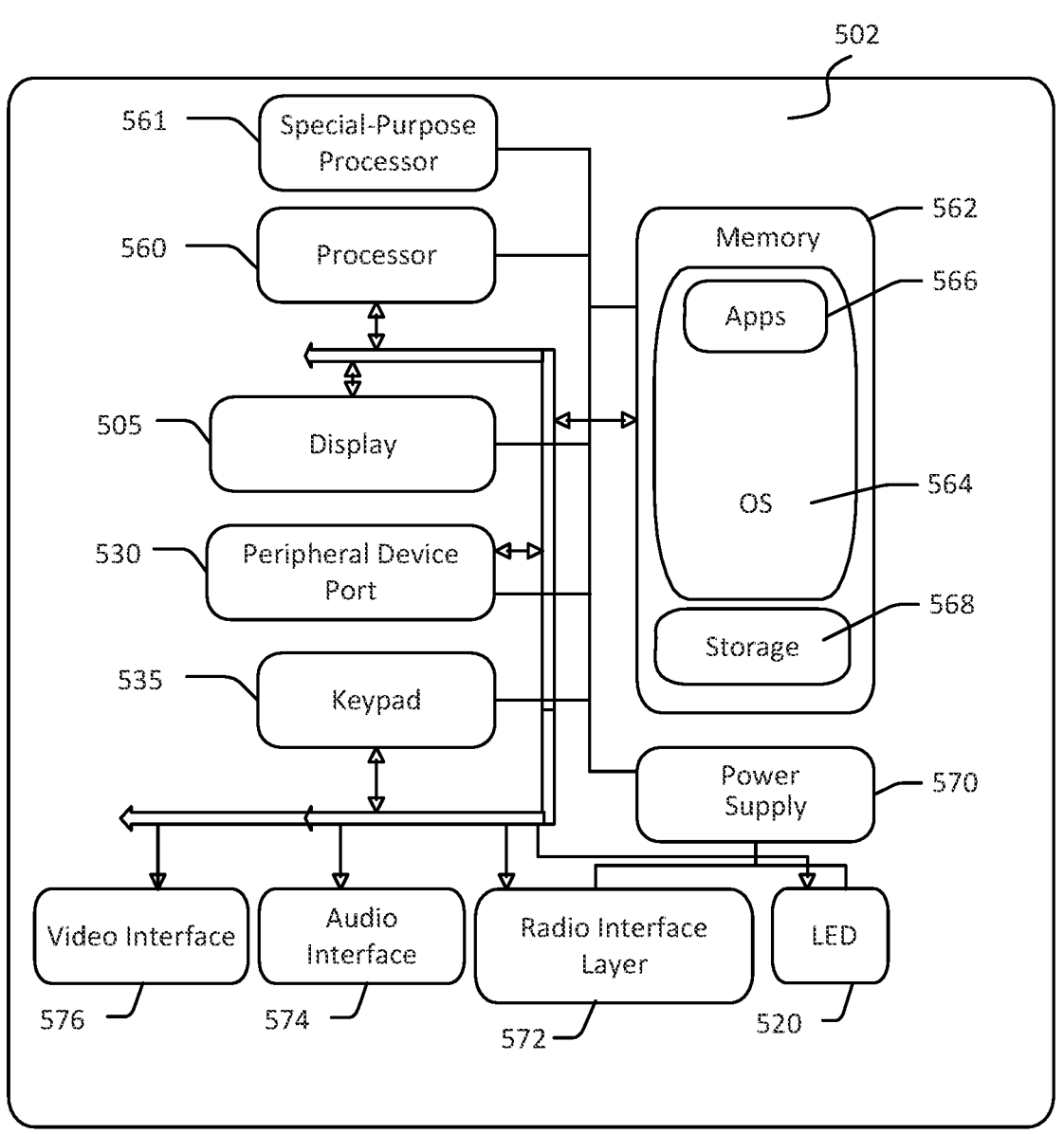

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein.

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
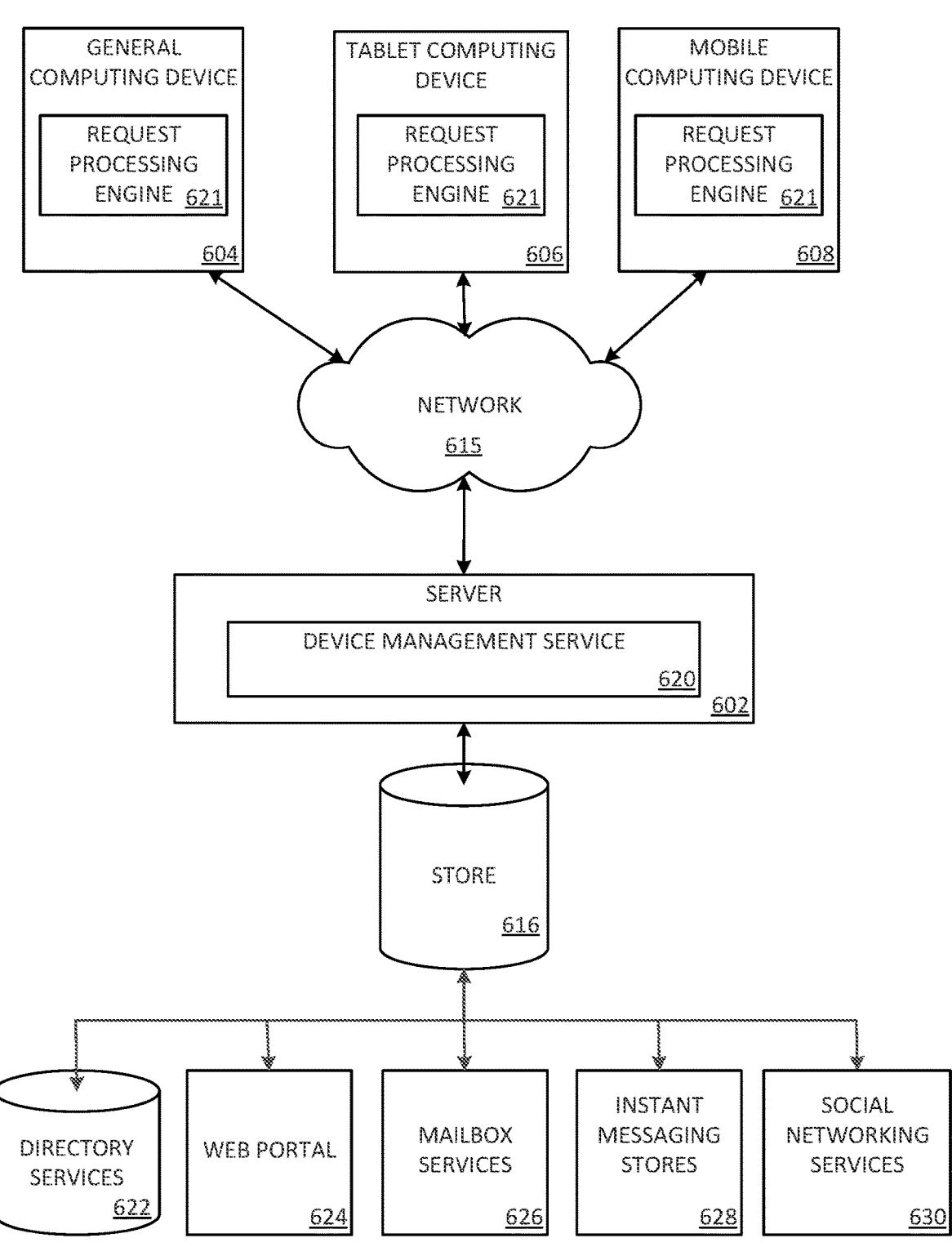
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630. Request processing engine 621 may be employed by a client that communicates with server device 602, and/or device management service 620 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
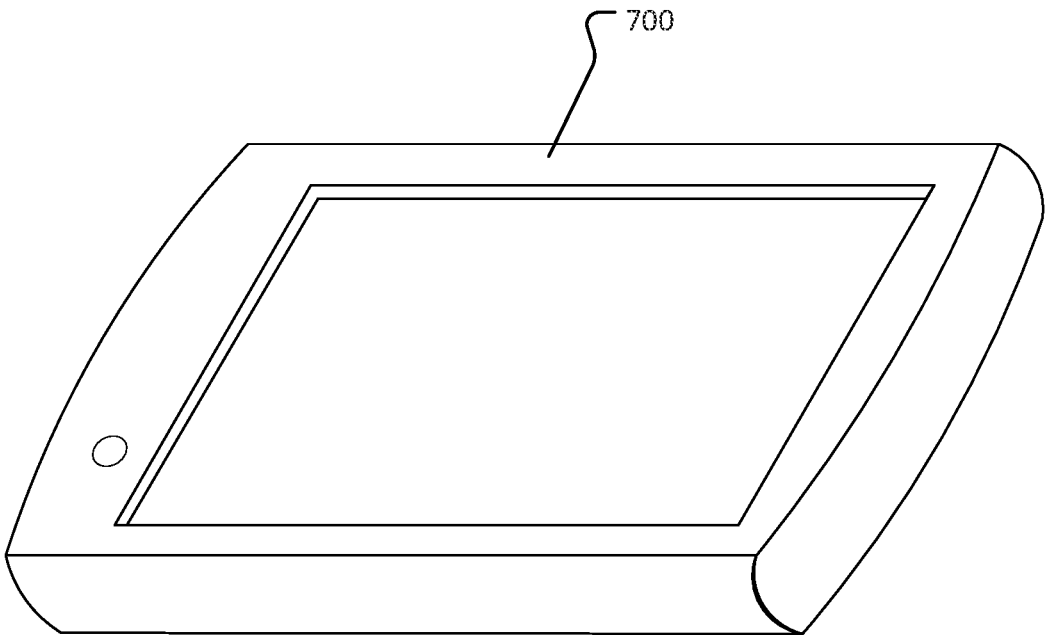
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations, the set of operations comprising: receiving an indication of user input at a first computing device associated with a step of a task session, wherein the indication comprises an identifier associated with the task session; determining, using the identifier, a set of computing devices associated with the task session, wherein the set of computing devices comprises the first computing device and a second computing device; determining a processing computing device to perform the step of the task session from the set of computing devices; and providing, to the processing computing device, an indication to process the user input associated with the step of the task session. In an example, the set of operations further comprises: receiving, from the processing computing device, a session state indication comprising session state information; when the processing computing device is the first computing device, providing a state update indication to the second computing device based on the session state information; and when the processing computing device is the second computing device, providing a state update indication to the first computing device based on the session state information. In another example, determining the processing computing device comprises evaluating at least one device characteristic of the first computing device and at least one device characteristic of the second computing device based on a requirement associated with the step to automatically determine the processing computing device. In a further example, determining the processing computing device comprises evaluating at least one device capability of the first computing device and at least one device capability of the second computing device based on a requirement associated with the step to automatically determine the processing computing device. In yet another example, providing the indication to process the user input associated with the step of the task session further comprises providing an indication to a third computing device that the processing computing device is processing the user input. In a further still example, the processing computing device is the second computing device, thereby causing the user to interact with a different computing device than received the user input to perform the step. In another example, the set of computing devices further comprises a third computing device, and the set of operations further comprises: determining the third computing device to perform the step of the task session, thereby causing the user to interact with both the second computing device and the third computing device to perform the step.

In another aspect, the technology relates to a method for initializing a task session associated with a set of computing devices. The method comprises: receiving, from a first computing device of a user, an indication of input associated with a step of a task, wherein the indication comprises an identifier; identifying, based on the identifier, a second computing device associated with the user; generating a task session associated with a set of computing devices, wherein the set of computing devices comprises the first computing device and the second computing device; determining a processing computing device to perform the step from the set of computing devices to process the input; and providing, to the processing computing device, an indication to process the input associated with the step of the task session. In an example, the method further comprises: receiving, from the processing computing device, a session state indication comprising session state information; when the processing computing device is the first computing device, providing a state update indication to the second computing device based on the session state information; and when the processing computing device is the second computing device, providing a state update indication to the first computing device based on the session state information. In another example, the method further comprises: receiving, from the second computing device, pre-session contextual information, wherein the pre-session contextual information comprises the identifier; and storing the pre-session contextual information. In a further example, the second computing device is identified based on the stored pre-session contextual information, and generating the task session further comprises analyzing the pre-session contextual information. In yet another example, the second computing device is identified by receiving an input comprising the identifier from the second computing device after receiving the indication from the first computing device. In a further still example, determining the processing computing device comprises evaluating a set of factors for each computing device based on a requirement associated with the step, wherein the set of factors are selected from the group consisting of: a computing device characteristic; a computing device capability; proximity of the computing device to the user; user preference information; and historical device usage information.

In a further aspect, the technology relates to another method for determining a computing device to perform a step of a task session. The method comprises: receiving an indication of user input at a first computing device associated with the step of the task session, wherein the indication comprises an identifier associated with the task session; determining, using the identifier, a set of computing devices associated with the task session, wherein the set of computing devices comprises the first computing device and a second computing device; determining a processing computing device to perform the step of the task session from the set of computing devices; and providing, to the processing computing device, an indication to process the user input associated with the step of the task session. In an example, the method further comprises: receiving, from the processing computing device, a session state indication comprising session state information; when the processing computing device is the first computing device, providing a state update indication to the second computing device based on the session state information; and when the processing computing device is the second computing device, providing a state update indication to the first computing device based on the session state information. In another example, determining the processing computing device comprises evaluating at least one device characteristic of the first computing device and at least one device characteristic of the second computing device based on a requirement associated with the step to automatically determine the processing computing device. In a further example, determining the processing computing device comprises evaluating at least one device capability of the first computing device and at least one device capability of the second computing device based on a requirement associated with the step to automatically determine the processing computing device. In yet another example, providing the indication to process the user input associated with the step of the task session further comprises providing an indication to a third computing device that the processing computing device is processing the user input. In a further still example, the processing computing device is the second computing device, thereby causing the user to interact with a different computing device than received the user input to perform the step. In another example, the processing device is determined based on at least one of historical device usage information and user preference information.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
generating a set of task requirements, wherein the set of task requirements is generated from user input at a first computing device;
evaluating a device profile, wherein the device profile is for a device of a set of computing devices associated with a task session, and comprises device hardware characteristics and device capabilities;
generating a rank for the set of computing devices using a weighted set of evaluated factors, wherein generating the rank comprises evaluating a first device characteristic of a second computing device and a second device characteristic of a third computing device based on the set of task requirements, wherein the first device characteristic and the second device characteristic are different; and
assigning, based on the ranking, one or more computing devices to process the user input, wherein the one or more devices are different from the first computing device.

2. The system of claim 1, wherein the set of operations further comprises:
receiving, from the first computing device, a session state indication comprising session state information; and
providing a state update indication to the second computing device of the set of computing devices based on the session state information from the first computing device.

3. The system of claim 1, wherein generating a rank comprises evaluating at least one device characteristic of the first computing device and at least one device characteristic of another computing device based on a requirement associated with the first computing device.

4. The system of claim 3, wherein generating the rank further comprises evaluating at least one device capability of the first computing device and at least one device capability of the second computing device based on a requirement associated with the first computing device.

5. The system of claim 1, wherein assigning further comprises providing an indication to a third computing device that the second computing device is processing the user input.

6. The system of claim 1, wherein the assigning thereby causes user interaction with the one or more computing devices.

7. The system of claim 6, wherein the set of computing devices further comprises the third computing device, and the assigning thereby causes user interaction with both the second computing device and the third computing device.

8. A method for initializing a task session associated with a set of computing devices, comprising:
generating a set of task requirements, wherein the set of task requirements is generated from input associated with a step of a task;
identifying, based on an identifier, a first computing device and a second computing device associated with a user;
generating a set of task requirements, wherein the set of task requirements is generated from user input at the first computing device;
generating a rank for the set of computing devices using a weighted set of evaluated factors, wherein generating the rank comprises evaluating device hardware characteristics based on the set of task requirements, device capabilities relating to functionality of the first computing device and the second computing device, and historical device information indicating previous device usage; and
assigning, based on the ranking, one or more computing devices to process the user input, wherein the one or more devices are different from the first computing device.

9. The method of claim 8, further comprising:
receiving, from the first computing device, a session state indication comprising session state information; and
providing a state update indication to the second computing device of the set of computing devices based on the session state information from the first computing device.

10. The method of claim 8, further comprising:
receiving, from the second computing device, pre-session contextual information, wherein the pre-session contextual information comprises an identifier; and
storing the pre-session contextual information.

11. The method of claim 10, wherein the second computing device is identified based on the stored pre-session contextual information, and wherein generating the task session further comprises analyzing the pre-session contextual information.

12. The method of claim 8, wherein the second computing device is identified by receiving an input comprising the identifier of the second computing device after receiving the indication from the first computing device.

13. The method of claim 8, wherein determining the processing computing device comprises evaluating a set of factors for each computing device based on a requirement, wherein the set of factors are selected from the group consisting of:
a computing device characteristic;
a computing device capability;
proximity of the computing device to the user;
user preference information; and
historical device usage information.

14. A method for determining a computing device to perform a step of a task session, comprising:
generating a set of task requirements, wherein the set of task requirements are generated from user input at a first computing device;
evaluating a device profile, wherein the device profile is for a device of a set of computing devices associated with the task session, and comprises device hardware characters and device capabilities;

generating a rank for the set of computing devices using a weighted set of evaluated factors, wherein generating the rank comprises evaluating a first device characteristic of a second computing device and a second device characteristic of a third computing device based on the set of task requirements, wherein the first device characteristic and the second device characteristic are different; and assigning, based on the ranking, one or more computing devices to process the user input, wherein the one or more devices are different from the first computing device.

15. The method of claim 14, further comprising:

receiving, from the first computing device, a session state indication comprising session state information; and providing a state update indication to a second computing device of the set of computing devices based on the session state information from the first computing device.

16. The method of claim 14, wherein generating the rank further comprises evaluating at least one device characteristic of the first computing device and at least one device characteristic of the second computing device based on a requirement associated with the first computing device.

17. The method of claim 14, evaluating further comprising evaluation of at least one device capability of the first computing device and at least one device capability of the second computing device based on a requirement associated with the first computing device.

18. The method of claim 14, wherein assigning further comprises providing an indication to the third computing device that the processing computing device is processing the user input.

19. The method of claim 14, wherein the assigning thereby causing the user to interact with the one or more computing devices.

20. The method of claim 14, wherein the first device is determined based on at least one of historical device usage information and user preference information.

* * * * *